United States Patent [19]

Kanno

[11] 3,925,162

[45] Dec. 9, 1975

[54] METHOD FOR SIMULTANEOUS DETERMINATION OF ENZYMATIC ACTIVITIES OF ENZYMES

[75] Inventor: Takashi Kanno, Tokyo, Japan

[73] Assignee: Chugai Seiyaku Kabushiki Kaisha, Tokyo, Japan

[22] Filed: Aug. 6, 1973

[21] Appl. No.: 385,815

[30] Foreign Application Priority Data

Aug. 17, 1972  Japan.............................. 47-81818

[52] U.S. Cl.......................................... 195/103.5 R
[51] Int. Cl.$^2$............................................ C12K 1/04
[58] Field of Search........................... 195/103.5 R

[56] References Cited
UNITED STATES PATENTS 3,438,866   4/1969   Penicnak...................... 195/103.5 R

OTHER PUBLICATIONS

Donald B. Roodyn "Principles and Practice of Multiple Enzyme Analysis" Automat. Anal. Chem. Technicon Symp. 3rd, 1967 (pub. 1968), 2, pp. 233-237, Chem. Abstract, Vol. 70, 1969, p. 23. 93301g.
H. U. Bergmeyer, Methods of Enzymatic Analysis, Academic Press, N.Y. and London, 1965, pp. 459-460, 737-738, 772-773, 831-832, 837-839, 846-848.

Primary Examiner—A. Louis Monacell
Assistant Examiner—C. A. Fan
Attorney, Agent, or Firm—Browdy and Neimark

[57] ABSTRACT

A method for the simultaneous determination of enzymatic activities of a plurality of enzymes in a single reaction medium which comprises adding a substrate of each of the enzymes to be determined and optionally reagents required for the measurement of the enzymatic activity to an aqueous solution containing a plurality of enzymes to be determined to allow the enzymatic reactions to proceed simultaneously under the same conditions, measuring simultaneously changes in the absorbance or fluorescence of the resulting reaction system with the lapse of time at a plurality of optional wavelengths which are different from each other and the number of which is equal to the number of the enzymes to be determined, formulating simultaneous equations of the first degree by taking advantage of the proportional relationship, which is independent with respect to each of the enzymes, between the measurement values and the enzymatic activities and determining the enzymatic activity of each of the enzymes by the thus formulated equations is disclosed.

23 Claims, 1 Drawing Figure

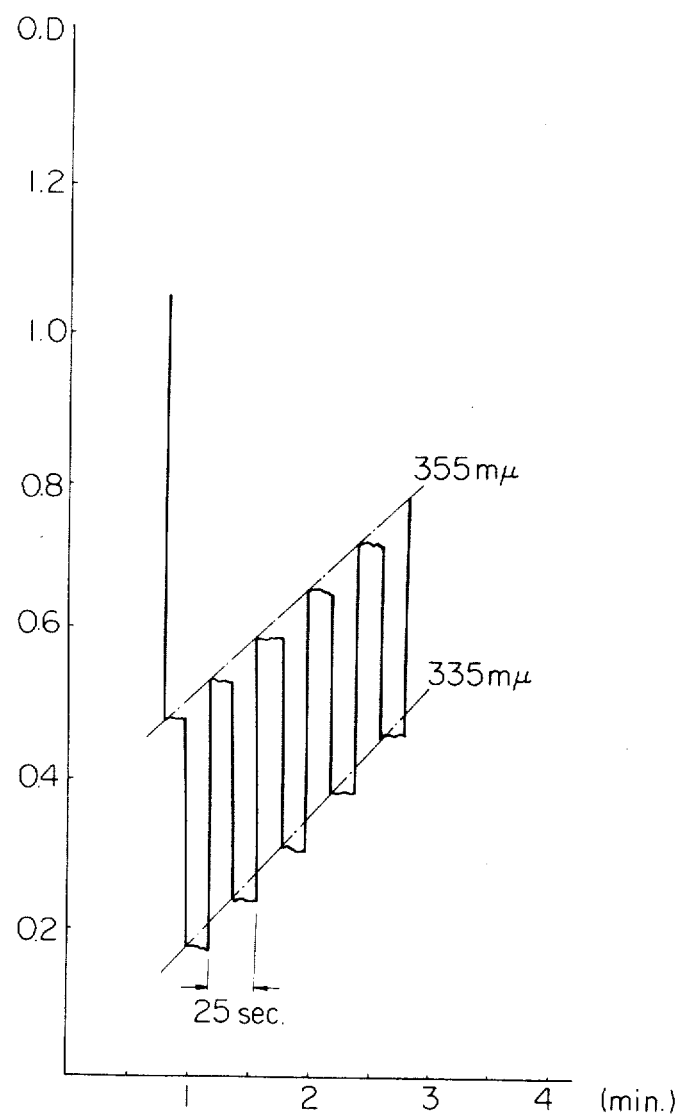

METHOD FOR SIMULTANEOUS DETERMINATION OF ENZYMATIC ACTIVITIES OF ENZYMES

BACKGROUND OF THE INVENTION

1. Field of the Invention

This invention relates to a method for the simultaneous determination of the enzymatic activities of a plurality of enzymes in a single enzymatic reaction medium. More particularly, this invention relates to a novel method for the simultaneous determination of the enzymatic activities of a plurality of enzymes in a single reaction medium which comprises adding a substrate of each of the enzymes to be determined and optionally reagents required for the determination of the enzymatic activity to an aqueous solution containing a plurality of enzymes to be determined to allow the enzymatic reactions to proceed simultaneously under the same conditions, measuring simultaneously changes in the absorbance ot fluorescence of the resulting reaction system with the lapse of time at a plurality of optional wavelengths which are different from each other and the number of which is equal to the number of the enzymes to be determined, formulating simultaneous equations of the first degree by taking advantage of the proportional relationship, which is independent with respect to each of the enzymes, between the measurement values and the enzymatic activities, and determining the enzymatic activity of each of the enzymes by the thus formulated equations.

2. Description of the Prior Art

It is a common practice that, in utilizing the enzymatic activities of the body fluid in clinical diagnosis, the physiological conditions are generally judged totally from the values determined on a plurality of enzymatic activities as well as the contents of other components and are not judged from the value determined on a single enzyme. The simultaneous determination of a number of enzymes is now conducted using a multi-channel analysis equipment, but the system used in the multi-channel analysis is very complicated and all of the equipment presently available for the analysis is based on the principle of determination of each component in the independent system and the equipment for multi-component analysis is a mere combination of the means for independent determination of each component suitably arranged to use in automatic measurement of the multi-component.

Also, the determination of the enzymatic activity can be carried out by analysis of initial velocity utilizing the spectrophotometry by measuring optical changes due to the enzymatic reaction with the lapse of time. In this method, however, a number of test samples cannot efficiently be determined due to the restriction of time since the time-difference analysis which is an exytremely time-consuming operation such as a chemical reaction must be conducted in a separate system even when the conventional multi-component analysis operated in an independent system is applied to the determination of the enzymatic activity.

SUMMARY OF THE INVENTION

An object of this invention is to provide a method for simultaneous determination of the enzymatic activity of a plurality of enzymes in a single reaction medium which provides accurate and reliable values easily and rapidly.

BRIEF DESCRIPTION OF THE ACCOMPANYING DRAWING

The FIGURE whows a relationship between the absorbance and the time in the enzyme determination of Example 1 as measured at wavelengths of 335 and 355 m $\mu$.

DETAILED DESCRIPTION OF THE INVENTION

The term "a plurality of enzymes" used throughout the specification and claims of this invention means a combination of enzymes which satisfies the following requirements:

a. the enzymatic reaction conditions of each of the enzymes are similar to each other, and the enzymes can be reacted with their substrates under the same reaction conditions, b. the substrates for enzymatic reactions, the resulting reaction products and the reagents to be added to the reaction system for the measurement of the enzymatic activity do not interact with each other nor do they adversely affect the measurement of the enzymatic activity.

As described previously, in accordance with the method of this invention, the enzymatic activity of a plurality of enzymes can be determined by adding a substrate required for the enzymatic reaction of each of the enzymes and, optionally, other reagents required for the determination of the enzymatic activity to a test sample of an aqueous solution contianing a plurality of enzymes to allow a plurality of enzymatic reactions to proceed simultaneously in a single reaction medium, measuring simultaneously changes in the absorbance or fluoroescence of the resulting reaction system with the lapse of time at a plurality of optional and different wavelengths, the number of which is equal to the number of enzymes to be determined, formulating simultaneous equations of the first degree by taking advantage of the proportional relationship, which is independent with respect to each of the enzymes, between the measurement values and the enzymatic activities, and determining the enzymatic activity of each of the enzymes by the thus formulated equations.

Typical examples of a plurality of enzymes which can be used in the method of this invention includes combinations of (a) leucine aminopeptidase (hereinafter referred to as LAP) or cholinesterase and (b) a dehydrogenase or a transaminase, the enzymatic activity of which can be determined in coupling with the dehydrogenase.

In determining the enzymatic activity of leucine aminopeptidase, L-leucyl-$\beta$-naphthylamine can be used as a substrate and the reaction product obtained from the enzymatic reaction is subjected to the measurement of changes in the absorbance of fluorescence with the lapse of time. In the same manner, in determining the enzymatic activity of cholinesterase, acetylthiocholine can be used as a substrate, and the measurement of changes in the absorbance or fluorescence is conducted on the reaction product obtained by the reaction between thiocholine produced in the enzymatic reaction and 4,4'-dithiopyridine or dithionitrobenzoic acid as an aid for the measurement, and in determining the dehydrogenase or the previously specified transaminase (the enzymatic activity of which can be determined in coupling with the dehydrogenase), the measurement of changes in the absorbance or fluorescence is conducted on pyridine nucleotide as a co-enzyme of the dehydrogenase.

The dehydrogenase which can be used in combination with leucine aminopeptidase or cholinesterase in the method of this invention may be any one of those having a pyridine nucleotide as a co-enzyme. Examples of the dehydrogenase are as follows:

1. Lactate dehydrogenase (L-lactate: NAD oxidoreductase; LDH)

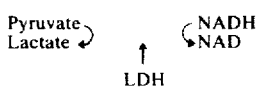

2. 2-Hydroxybutyrate dehydrogenase

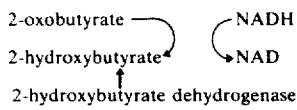

Examples of the transaminase which can be used in the method of this invention in coupling with a dehydrogenase for the measurement of the enzymatic activity are as follows:

1. Glutamate oxalacetate transaminase (L-Aspartate: 2-oxoglutarate aminotransferase; GOT)

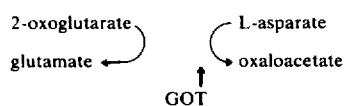

2. Glutamate pyruvate transaminase (L-Alanine: 2-oxoglutarate aminotransferase; GPT)

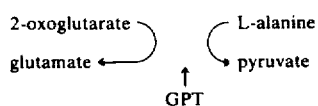

The enzymatic activity of the above transaminase, i.e., glutamate oxaloacetate transaminase or glutamate pyruvate transaminase, can be determined in coupling with malate dehydrogenase or lactate dehydrogenase, respectively, according to the following mechanisms:

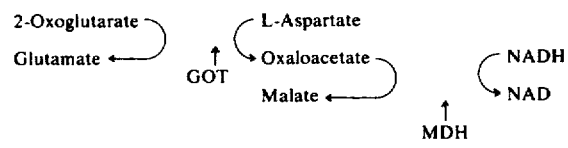

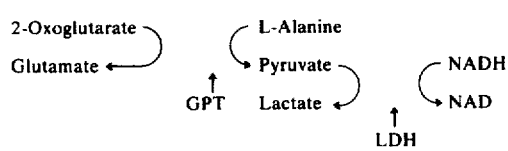

In carrying out the method of this invention, a substrate for each of the enzymes and other reagents required for the measurement of the enzymatic activity of each of the enzymes are added to an aqueous solution containing a plurality of enzymes whereby a plurality of enzymatic reactions are allowed to proceed simultaneously in a single reaction medium. The substrate and the reagents may be added separately to the solution of enzymes, but are preferably added as a solution in a buffering solution which has previously been prepared using an appropriate buffering solution suitable for the enzymatic reaction.

Examples of the substrate and reagents used for LAP, cholinesterase, dehydrogenase and transaminase are as follows:

a. LAP

L-leucyl-$\beta$-naphthylamide as a substrate.

b. Cholinesterase acetylthiocholine as a substrate, and 4,4'-dithiopyridine or dithionitrobenzoic acid as an aid for measurement.

c. Dehydrogenase substrate corresponding to respective dehydrogenase, i.e., a pyruvate and NADH for LDH; 2-oxobutyrate and NADH for 2-hydroxybutyrate dehydrogenase.

d. Transaminase substrate corresponding to respective dehydrogenase, and a dehydrogenase which can be coupled with the transaminase plus NADH as aids for measurements, i.e., 2-oxoglutarate and L-aspartate as substrate and a malate dehydrogenase and NADH as aids for measurement for GOT; 2-oxoglutarate and L-alanine as substrate and a lactate dehydrogenase and NADH as aids for measurement for GPT.

In carrying out the enzymatic reactions, it is necessary to select the optimum reaction conditions with respect to each of the enzymes, under which the enzymatic reactions of a plurality of enzymes to be determined take place simultaneously, but, generally, the enzymatic reaction of the above described LAP, cholinesterase, dehydrogenase and transaminase can be conducted at a pH value of approximately 7.0 at a temperature of from 25° to 40°C, for example, 25°C, 30°C, 37°C, etc.

The measurement of changes in the absorbance or fluorescence of the resulting reaction system can be carried out by any conventional procedure using a spectrophotometer or fluorophotometer. The wavelength used in the measurement is not critical, but, in order to obtain more reliable accurate results, it is preferable to use wavelengths at which a great difference in the absorbance can be obtained depending upon the type of the measurement procedure. For example, better results can be obtained when the reaction system is measured at wavelengths of 335 and 355 m$\mu$ for LAP and dehydrogenase or transaminase, at wavelengths of 325 and 340 m$\mu$ for cholinesterase and dehydrogenase or transaminase where 4,4'-dithiopyridine is used as an aid for measurement and at wavelengths of 340 and 400 m$\mu$ for dithionitrobenzoic acid.

A preferred embodiment for the simultaneous determination of LAP and GOT contained in a sample is set forth below, but it is to be understood that the method of this invention is not limited thereto. In this embodiment, a mixed substrate solution is first prepared from NADH, L-aspartate, MDH, 2-oxoglutarate and L-leucyl-$\beta$-naphthyamide dissolved in a buffered solution. A predetermined amount of the thus prepared mixed substrate solution is then placed in a cell for measurement (cuvette cell) and incubated for a while. An appropriate amount of a test solution containing a plurality of enzymes to be determined is then mixed with the substrate solution in the cuvette cell and immediately thereafter the changes in the absorbance or fluorescence of the sample with the lapse of time at a plurality of wavelengths (the number of which corresponds to the number of enzymes to be determined) are measured simultaneously or alternately. The enzymatic activity of each of the enzymes can then be calculated by the thus obtained changes in the absorbance or fluorescence versus the measurement time.

For instance, the enzymatic activities $E_1$ and $E_2$ in a two-component system can be calculated as follows: That is, the relationships between the changes in absorbance (or fluorescence) $\Delta A_1$ and $\Delta A_2$ at specific wavelengths $A_1$ and $A_2$ and the enzymatic activities $E_1$ and $E_2$ are represented by the following equations 1) and 2), and, therefore, $E_1$ and $E_2$ can be calculated by the following equations 3) and 4), respectively, $$A_1 = E_1 \times P_1(A_1) + E_2 \times P_2(A_1) \quad 1)$$

$$A_2 = E_1 \times P_1(A_2) + E_2 + P_2(A_2) \quad 2)$$

$$E_1 = \frac{\Delta A_1 \times P_2(A_2) - \Delta A_2 \times P_2(A_1)}{P_1(A_1) \times P_2(A_2) - P_1(A_2) \times P_2(A_1)} \quad 3)$$

$$E_2 = \frac{\Delta A_1 \times P_2(A_2) - \Delta A_2 \times P_2(A_1)}{P_1(A_1) \times P_2(A_2) - P_1(A_2) \times P_2(A_1)} \quad 4)$$

wherein $P_1(A_1)$ and $P_1(A_2)$ represent the molecular extinction coefficients (absorbancy indexes) of the reaction product $P_1$ of the enzyme $E_1$ at the wavelengths $A_1$ and $A_2$, and $P_2(A_1)$ and $P_2(A_2)$ represent those of the reaction product $P_2$ of the enzyme $E_2$ at the wavelengths $A_1$ and $A_2$.

The method of this invention has been described in detail with respect to the two-component system where two different types of enzymes are coexistent as an embodiment of "a plurality of enzymes", but it should be noted that the method of this invention can be applied to systems where more than two different types of enzymes are present by using an appropriate combination of the measurment procedures to determine the enzymatic activities of the enzymes simultaneously in a single reaction medium so long as the enzymes present in the medium satisfy the requirements as set forth previously.

Thus, the method of this invention makes it possible to determined the enzymatic activities of a plurality of enzymes easily and rapidly with accurate and reliable results.

The present invention is further illustrated by the following examples, but they are not to be construed as limiting the scope of this invention.

Example 1

Simultaneous Determiantion of LDH and LAP a) Reaction System
  Blood Serum 0.1 ml
  Substrate Buffered Solution 2.9 ml
b) Reagent
  Composition of Substrate Buffered Solution
   L-leucyl-β-naphthylamide 0.45 mM
   pyruvate 0.3 mM
   NADH 0.1 mM
  contained in 0.2 M phosphate buffered solution (pH 7.2)

The substrate buffered solution having the above composition was placed into a cell for measurement and warmed to 37°C. The blood serum was then added to the cell followed by mixing, and immediately thereafter changes in the absorbance of the resulting mixture at wavelengths of 335 mµ and 355 mµ were measured alternately. The results obtained are shown in Figure. The measurement of the absorbance was conducted by Hitachi 124 Model Automatic Spectrophotometer equipped with a wavelength programmer.

c. Calculation

The following values were calculated by the equations given previously from a preparative experiment using an authentic sample:

$P_1A_1$: NADH 335 mµ = $6.16 \times 10^3$
$P_1A_2$: NADH 355 mµ = $4.94 \times 10^3$
$P_2A_1$: β-NA 335 mµ = $1.78 \times 10^3$
$P_2A_2$: β-NA 355 mµ = $0.54 \times 10^3$ From the above values, the enzymatic activity of each of LDH and LAP are calculated by the equations 3) and 4), respectively, as follows:

LDH:
$$E_1 = \frac{O.D.335 \times 0.54 - O.D.335 \times 1.78}{6.16 \times 0.54 - 4.94 \times 1.78} \times 10^4 \times 3$$

LAP:
$$E_2 = \frac{O.D.335 \times 6.16 - O.D.335 \times 4.94}{6.16 \times 0.54 - 4.94 \times 1.78} \times 3 \times 10^4$$

In the same manner as described above, the enzymatic activity of LDH and LAP was determined simultaneously and independently for various samples of blood serum and the results obtained are shown in Table 1 below. The results indicate that the values determined simultaneously in accordance with the method of this invention are highly consistent with the corresponding values determined independently.

Table 1

| Sample No. | LDH | | LAP | |
|---|---|---|---|---|
| | Simultaneously | Independently | Simultaneously | Independently |
| 1 | 480 | 480 | 351 | 370 |
| 2 | 282 | 276 | 337 | 349 |
| 3 | 341 | 345 | 404 | 421 |
| 4 | 433 | 430 | 118 | 125 |
| 5 | 351 | 346 | 67 | 69 |
| 6 | 453 | 449 | 489 | 499 |
| 7 | 628 | 652 | 623 | 636 |
| 8 | 180 | 180 | 135 | 135 |
| 9 | 195 | 199 | 101 | 121 |
| 10 | 935 | 920 | 101 | 106 |
| 11 | 237 | 249 | 219 | 227 |
| 12 | 1245 | 1295 | 226 | 248 |
| 13 | 348 | 340 | 118 | 128 |

In the above table, the unit of the values is an international unit determined at 37°C.

EXAMPLE 2

Simultaneous Determination of Choline-Esterase and LDH a) Reaction System
  Blood Serum 20 µl
  Substrate Buffered Solution 3.0 ml
b) Reagent
  Composition of Substrate Buffered Solution
   Acetylthiocholine 0.25 mM
   4,4'-Dithiopyridine 0.1 mM
   Pyruvate 0.3 mM
   NADH 0.1 mM
  contained in 0.1 M phosphate buffered -continued solution (pH 7.2)

In the same manner as described in Example 1, the changes in the absorbance at wavelengths of 325 m$\mu$ and 340 m$\mu$ of various samples of blood serum were measured simultaneously and independently using the above buffered solution to determine the enzymatic activity of each of choline-esterase and LDH. The results obtained are shown in Table 2 below.

Table 2

| Sample No. | LDH | | Choline-Esterase | |
|---|---|---|---|---|
| | Simulta-neously | Indepen-dently | Simulta-neously | Indepen-dently |
| 1 | 720 | 700 | 215α* | 225α |
| 2 | 140 | 155 | 216α | 229α |
| 3 | 160 | 155 | 200α | 215α |
| 4 | 492 | 486 | 165α | 143α |
| 5 | 945 | 940 | 267α | 250α |
| 6 | 320 | 320 | 95α | 100α |

*α: correction index due to the use of an approximate value as a molecular extinction coefficient of 4,4''-dithiopyridine In the above table, the unit of the values is an international unit determined at 37°C.

EXAMPLE 3

Simultaneous Determination of LAP and GPT a) Reaction System
   Blood Serum                         0.2 ml
   Substrate Buffered Solution         2.8 ml
b) Reagent
   Composition of Substrate Buffered Solution
   L-leucyl-β-naphthylamide           0.45 mM
   L-alanine                          74 mM
   LDH                                16 I.U.
   2-oxoglutarate                     14 mM
   NADH                               0.1 mM contained in 0.2 M phosphate buffered solution (pH 7.2)

In the same manner as described in Example 1, the changes in the absorbance at wavelengths of 335 m$\mu$ and 355 m$\mu$ of various samples of blood serum were measured simultaneously and independently using the above buffered solution to determine the enzymatic activity of both LAP and GPT. The results obtained are shown in Table 3 below.

Table 3

| Sample No. | GPT | | LAP | |
|---|---|---|---|---|
| | Simulta-neously | Indepen-dently | Simulta-neously | Indepen-dently |
| 1 | 19 | 18 | 123 | 130 |
| 2 | 36 | 33 | 226 | 233 |
| 3 | 69 | 65 | 496 | 508 |

In the above table, the unit of the values is an international unit determined at 37°C.

EXAMPLES 4 – 6

The experiments described in Examples 1 to 3 were carried out in each case using a combination of LAP or choline-esterase with one of the various dehydrogenase or transaminase and approximately the same tendency of results was obtained in each case. The results obtained are shown in Table 4 below.

Table 4

| Ex. No. | A plurality of Enzymes | | Reaction System | Reagent: Composition of Substrate buffered Solution | pH | Temp. | Determined Wavelengths (m$\mu$) |
|---|---|---|---|---|---|---|---|
| | LAP or Choline-Esterase | Dehydrogenase or Transaminase | | | | | |
| 4 | LAP | 2-hydroxy-butyrate dehydrogenase | Blood Serum 0.1 ml Substrate Buffered Solution 2.9 ml | L-leucyl-β-naphthylamide 0.45 mM 2-oxobutyrate 1 mM NADH 0.1 mM in 0.2 M phosphate buffered solution (pH 7.2) | 7.2 | 37°C | 335 and 345 |
| 5 | " | GOT | Blood Serum 0.2 ml Substrate Buffered Solution 2.8 ml | L-Leucyl-β-naphthylamide 0.45 mM 2-oxoglutarate 6.6 mM L-aspartate 36 mM malate dehydrogenase 30 I.U. NADH 0.1 mM in 0.2 M phosphate buffered solution (pH 7.2) | 7.2 | 37°C | " |
| 6 | choline-esterase | 2-hydroxy-butyrate dehydrogenase | Blood Serum 20 μl Substrate Buffered Solution 3.0 ml | acetylthiocholine 0.25 mM 4,4'-dithiopyridine 0.1mM 2-oxobutyrate 1 mM NADH 0.1 mM in 0.1 M phosphate buffered solution (pH 7.2) | 7.2 | 37°C | 325 and 340 |

What is claimed is:

1. A method for the simultaneous determination of enzymatic activities of a plurality of enzymes in a single reaction medium, comprising:

adding a substrate for each of the enzymes to be determined, each substrate being selected such that it is capable of giving an enzymatic reaction with its respective enzyme, it does not interact with the other sybstrates, reaction products or reagents used and it does not adversely affect the measurement of the enzymatic activity, to an aqueous solution containing a plurality of enzymes to be determined, the enzymes being selected such that the enzymatic conditions of each are similar to each other and they can be reacted with their respective substrates under the same reaction conditions;

simultaneously reacting each of the enzymes with their respective substrates under the optimum reaction conditions with respect to each of the enzymes under which the enzymatic reactions of the plurality of enzymes to be determined take place simultaneously;

measuring simultaneously changes in the absorbance or fluorescence of the resulting reaction system with the lapse of time at a plurality of optional wavelengths which are different from each other and the number of which is equal to the number of enzymes to be determined;

formulating simultaneous equations of the first degree by taking advantage of the proportional relationship, which is independent with respect to each of the enzymes, between the measurement values and the enzymatic activities; and determining the enzymatic activity of each of the enzymes by the thus formulated equations.

2. A method according to claim 1 wherein the plurality of enzymes is a combination of leucine aminopeptidase or cholinesterase and a dehydrogenase or a transaminase, the enzymatic activity of which can be determined in coupling with a dehydrogenase.

3. A method according to claim 2 wherein said dehydrogenase is selected from the group consisting of lactate dehydrogenase and 2-oxobutyrate dehydrogenase.

4. A method according to claim 2 wherein said transaminase is selected from the group consisting of glutamate oxalacetate transaminase and glutamate pyruvate transaminase.

5. A method for the simultaneous determination of enzymatic activities in a single reaction medium, comprises: adding
   a. L-leucyl-β-naphthylamide as a substrate for the measurement of the enzymatic activity of leucine aminopeptidase,
   b. acetylthiocholine as a substrate and 4,4' dithiopyridine or dithionitrobenzoic acid as an aid for the measurement of the enzymatic activity of cholinesterase,
   c. a substrate for the measurement of the enzymatic activity of a dehydrogenase, and
   d. a substrate of a transaminase, and a dehydrogenase which is capable of being coupled with the transaminase plus NADH as aids for measurement, for the measurement of the enzymatic activity of the transaminase, to an aqueous solution containing leucine aminopeptidase or cholinesterase and a dehydrogenase or a transaminase, the enzymatic activity of which can be determined in coupling with said hydrogenase;

allowing the two enzymatic reactions to proceed in a single reaction medium simultaneously under the optimum reaction conditions with respect to each of the enzymes under which the enzymatic reactions of the plurality of enzymes to be determined take place simultaneously;

measuring changes in the absorbance or fluorescence at optional different two wavelengths for a period of predetermined time with the lapse of time;

formulating simultaneous equations of the first degree by taking advantage of the proportional relationship between the absorbance at each of the wavelengths or changes in the fluorescence with the lapse of time and the each of the enzymatic activities; and determing the enzymatic activity of each of the enzymes by the thus formulated equations.

6. A method according to claim 5 wherein said dehydrogenase is selected from the group consisting of lactic dehydrogenase and 2-hydroxybutyrate dehydrogenase.

7. A method according to claim 5 wherein said transaminase is selected from the group consisting of glutamic oxalacetic transaminase and glutamate pyruvate transaminase.

8. A method according to claim 5 wherein the enzymatic activity of each of the enzymes is calculated by the following equations from the measurement values of changes in the absorbance at optional different wavelengths or of changes in the fluorescence with the lapse of time:

$$E_1 = \frac{\Delta A_1 \times P_2(A_2) - \Delta A_2 \times P_2(A_1)}{P_1(A_1) \times P_2(A_2) - P_1(A_2) \times P_2(A_1)}$$

$$E_2 = \frac{\Delta A_2 \times P_1(A_1) - \Delta A_1 \times P_1(A_2)}{P_1(A_1) \times P_2(A_2) - P_1(A_2) \times P_2(A_1)}$$

wherein $E_1$ and $E_2$ each represents an enzymatic activity of the enzyme to be determined; $\Delta A_1$ and $\Delta A_2$ each represents changes in the absorbance or the fluorescence at optional two wavelengths $A_1$ and $A_2$ with the lapse of time; $P_1(A_1)$ and $P_2(A_2)$ each represents a molecular extinction coefficient of the enzymatic reaction product of the enzyme having the enzymatic activity of $E_1$ at the wavelengths of $A_1$ and $A_2$; and $P_2(A_1)$ and $P_2(A_2)$ each represents a molecular extinction coefficient of the enzymatic reaction product of the enzyme having the enzymatic activity of $E_2$.

9. A method for the simultaneous determination of enzymatic activities of the enzymes LAP and lactate dehydrogenase in a single reaction medium, comprising:
   adding
   a. L-leucyl-β-naphthylamide as a substrate for detecting LAP and
   b. a pyruvate and a reduced type of niacine adenine dinucleotide (NADH) as substrates for detecting dehydrogenase to a sample of an aqueous enzyme solution containing LAP and lactate dehydrogenase;

allowing the two types of enzymatic reaction to proceed simultaneously in a single reaction medium under the optimum reaction conditions with respect to each of the enzymes under which the enzymatic reactions of the plurality of enzymes to be determined take place simultaneously;

measuring the changes in absorbance or fluorescence of the reaction system with the lapse of time at wavelengths 335 and 355 mμ;

formulating simultaneous equations of the first degree by taking advantage of the proportional relationship, which is independent with respect to each of the enzymes, between the measurement values and enzymatic activities of the enzymes present in said enzyme solution; and determining the enzymatic activity of each of said enzymes by the thus formulated equations.

10. A method according to claim 9 wherein said enzymatic reaction is conducted at a pH value of 7.2 at a temperature of 37°C.

11. A method for the simultaneous determination of enzymatic activities of the enzymes LAP and 2-hydroxybutyrate dehydrogenase in a single reaction medium, comprising:
   adding
   a. L-leucyl-β-naphthylamide as a substrate for detecting LAP and
   b. 2-oxobutyrate and a reduced type of niacine adenine dinucleotide (NADH) as substrates for detecting 2-hydroxybutyrate dehydrogenase to a sample of an aqueous enzyme solution containing LAP and 2-hydroxybutyrate dehydrogenase;

allowing the two types of enzymatic reaction to proceed simultaneously in a single reaction medium under the optimum reaction conditions with respect to each of the enzymes under which the enzymatic reactions of the plurality of enzymes to be determined take place simultaneously;

measuring the changes in absorbance or fluorescence of the reaction system with the lapse of time at wavelengths 335 and 355 m$\mu$;

formulating simultaneous equations of the first degree by taking advantage of the proportional relationship, which is independent with respect to each of the enzymes, between the measurement values and enzymatic activities of the enzymes present in said enzyme solution; and determining the enzymatic activity of each of said enzymes by the thus formulated equations.

12. A method according to claim 11 wherein said enzymatic reaction is conducted at a pH value of 7.2 at a temperature of 37°C.

13. A method for the simultaneous determination of enzymatic activities of the enzymes LAP and glutamate oxalacetate transaminase in a single reaction medium, comprising:

adding
  a. L-leucyl-$\beta$-naphthylamide as a substrate for detecting LAP and
  b. 2-oxoglutarate and L-asparate as substrates for detecting oxalacetate transaminase as well as malate dehydrogenase and a reduced type of niacine adenine dinucleotide (NADH) as aids for detection of the enzyme to a sample of an aqueous enzyme solution containing LAP and glutamate oxalacetate transaminase;

allowing the two types of enzymatic reaction to proceed simultaneously in a single reaction medium under the optimum reaction conditions with respect to each of the enzymes under which the enzymatic reactions of the plurality of enzymes to be determined take place simultaneously;

measuring the changes in absorbance or fluorescence of the reaction system with the lapse of time at wavelengths 335 and 355 m$\mu$;

formulating simultaneous equations of the first degree by taking advantage of the proportional relationship, which is independent with respect to each of the enzymes, between the measurement values and enzymatic activities of the enzymes present in said enzyme solution; and determining the enzymatic activity of each of said enzymes by the thus formulated equations.

14. A method according to claim 13 wherein said enzymatic reaction is conducted at a pH value of 7.2 at a temperature of 37°C.

15. A method for the simultaneous determination of enzymatic activities of the enzymes LAP and glutamate pyruvate transaminase in a single reaction medium, comprising:

adding
  a. L-leucyl-$\beta$-naphthylamide as a substrate for detecting LAP and
  b. 2-oxoglutarate and L-alanine as substrates for detecting glutamate pyruvate transaminase as well as lactate dehydrogenase and a reduced type of niacine adenine dinucleotide (NADH) as aids for detection of the enzyme to a sample of an aqueous enzyme solution containing LAP and glutamate pyruvate transaminase;

allowing the two types of enzymatic reaction to proceed simultaneously in a single reaction medium under the optimum reaction conditions with respect to each of the enzymes under which the enzymatic reactions of the plurality of enzymes to be determined take place simultaneously;

measuring the changes in absorbance or fluorescence of the reaction system with the lapse of time at wavelengths 335 and 355 m$\mu$;

formulating simultaneous equations of the first degree by taking advantage of the proportional relationship, which is independent with respect to each of the enzymes, between the measurement values and enzymatic activities of the enzymes present in said enzyme solution; and determining the enzymatic activity of each of said enzymes by the thus formulated equations.

16. A method according to claim 15 wherein said enzymatic reaction is conducted at a pH value of 7.2 at a temperature of 37°C.

17. A method for the simultaneous determination of enzymatic activities of the enzymes choline-esterase and lactate dehydrogenase in a single reaction medium, comprising:

adding
  a. acetylthiocholine as a substrate for detecting choline-esterase and 4,4'-dithiopyridine or dithionitrobenzoic acid as an aid for measurement of choline-esterase activity, and
  b. pyruvate and a reduced type of niacine adenine dinucleotide (NADH) as substrates for detecting lactate dehydrogenase to a sample of an aqueous enzyme solution containing cholineesterase and lactate dehydrogenase;

allowing the two types of enzymatic reaction to proceed simultaneously in a single reaction medium under the optimum reaction conditions with respect to each of the enzymes under which the enzymatic reactions of the plurality of enzymes to be determined take place simultaneously.

measuring the changes in absorbance or fluorescence of the reaction system with the lapse of time at wavelengths 325 and 340 m$\mu$;

formulating simultaneous equations of the first degree by taking advantage of the proportional relationship, which is independent with respect to each of the enzymes, between the measurement values and enzymatic activities of the enzymes present in said enzyme solution; and determining the enzymatic activity of each of said enzymes by the thus formulated equations.

18. A method according to claim 17 wherein said enzymatic reaction is conducted at a pH value of 7.2 at a temperature of 37°C.

19. A method for the simultaneous determination of enzymatic activities of the enzyes choline-esterase and 2-hydroxybutyrate hydrogenase in a single reaction medium, comprising:

adding
  a. acetylthiocholine as a substrate for detecting choline-esterase and 4,4'-dithiopyridine or dithionitrobenzoic acid as an aid for measurement of choline-esterase activity, and
  b. 2-oxobutyrate and a reduced type of niacine adenine dinucleotide (NADH) as substrates for detecting 2-hydroxybutyrate dehydrogenase to a sample of an aqueous enzyme solution containing cholineesterase and 2-hydroxybutyrate dehydrogenase;

allowing the two types of enzymatic reaction to proceed simultaneously in a single reaction medium under the optimum reaction conditions with respect to each of the enzymes under which the enzymatic reactions of the plurality of enzymes to be determined take place simultaneously;

measuring the changes in absorbance or fluorescence of the reaction system with the lapse of time at wavelengths 325 and 340 m$\mu$;

formulating simultaneous equations of the first degree by taking advantage of the proportional relationships, which is independent with respect to each of the enzymes, between the measurement values and enzymatic activities of the enzymes present in said enzyme solution; and determining the enzymatic activity of each of said enzymes by the thus formulated equations.

20. A method according to claim 19 wherein said enzymatic reaction is conducted at a pH value of 7.2 at a temperature of 37°C.

21. A method in accordance with claim 1 wherein said reactions conditions are under a pH of approximately 7.0 at a temperature of from 25° to 40° C.

22. A method in accordance with claim 5 where said reactions conditions are under a pH of approximately 7.0 at a temperature of from 25° to 40° C.

23. A method in accordance with claim 1 wherein said adding step further includes the addition of other reagents useful as aids for the measurement of the enzymatic activity, which reagents are selected such that they do not interact with the substrates, reaction products or other reagents used and they do not adversely affect the measurement of the enzymatic activity.

* * * * *

UNITED STATES PATENT OFFICE
CERTIFICATE OF CORRECTION

PATENT NO. : 3,925,162
DATED : December 9, 1975
INVENTOR(S) : Takashi KANNO

It is certified that error appears in the above-identified patent and that said Letters Patent are hereby corrected as shown below:

Column 1, line 21, "ot" should read --or--. Column 2, line 4, "whows" should read --shows--. Column 2, line 55, "of" should read --or--. Column 5, line 26, equation 4) should read $$--E_2 = \frac{\Delta A_2 \times P_1(A_1) - \Delta A_1 \times P_1(A_2)}{P_1(A_1) \times P_2(A_2) - P_1(A_2) \times P_2(A_1)} --$$

Signed and Sealed this twenty-seventh Day of April 1976

[SEAL]

Attest:

RUTH C. MASON
*Attesting Officer*

C. MARSHALL DANN
*Commissioner of Patents and Trademarks*